United States Patent [19]
Chandler et al.

[11] Patent Number: 5,296,690
[45] Date of Patent: Mar. 22, 1994

[54] SYSTEM FOR LOCATING AND DETERMINING THE ORIENTATION OF BAR CODES IN A TWO-DIMENSIONAL IMAGE

[75] Inventors: Donald G. Chandler; Eric P. Batterman, both of Princeton, N.J.

[73] Assignee: Omniplanar, Inc., Princeton, N.J.

[21] Appl. No.: 766,909

[22] Filed: Sep. 26, 1991

Related U.S. Application Data

[63] Continuation of Ser. No. 500,802, Mar. 28, 1991, abandoned.

[51] Int. Cl.⁵ .......................... G06K 7/20; G06K 9/80
[52] U.S. Cl. ........................................ 235/462; 382/48
[58] Field of Search ............... 235/454, 462, 471, 472, 235/470; 250/566, 568; 356/71; 382/10, 48

[56] References Cited

U.S. PATENT DOCUMENTS

| | | | |
|---|---|---|---|
| 3,801,775 | 4/1974 | Acker | 235/61.11 |
| 4,282,425 | 8/1981 | Chadima et al. | 235/462 |
| 4,394,683 | 7/1983 | Liptay-Wagner et al. | 358/107 |
| 4,488,679 | 12/1984 | Bockholt et al. | 235/469 |
| 4,500,776 | 2/1985 | Laser | 235/162 |
| 4,544,064 | 10/1985 | Felder | 235/471 |
| 4,570,057 | 2/1986 | Chadima et al. | 235/472 |
| 4,613,942 | 9/1986 | Chen | 250/568 |
| 4,727,419 | 2/1988 | Yamada et al. | 358/101 |
| 4,745,269 | 5/1988 | Van Gils | 235/454 |
| 4,758,716 | 7/1988 | Mayer et al. | 235/470 |
| 4,766,300 | 8/1988 | Chadima et al. | 235/472 |
| 4,822,986 | 4/1989 | Guthmueller et al. | 235/462 |
| 4,874,936 | 10/1989 | Chandler et al. | 235/494 |
| 4,896,029 | 1/1990 | Chandler et al. | 235/494 |
| 4,924,078 | 5/1990 | Sant'Anselmo et al. | 235/487 |
| 4,958,064 | 9/1990 | Kirkpatrick | 235/462 |
| 4,988,852 | 1/1991 | Krishnan | 235/462 |

*Primary Examiner*—Davis L. Willis
*Assistant Examiner*—Edward Sikorski
*Attorney, Agent, or Firm*—Allan Jacobson

[57] ABSTRACT

A bar code reader includes an image capture means for storing a two dimensional image in memory, which stored image may include a bar code symbol within the field of view of said image. The present bar code reader further includes method and apparatus for determining the location and orientation of said bar code symbol within the field of view of said image, and then filtering said located and oriented bar code symbol along an axis perpendicular to said detected orientation. Thereafter, the filtered bar code symbol is scanned and applied to a decoder to produce a decoded bar code output.

22 Claims, 12 Drawing Sheets

LOCATION SCORE = 810

LOCATION SCORE = 57

SYSTEM FOR LOCATING AND DETERMINING THE ORIENTATION OF BAR CODES IN A TWO-DIMENSIONAL IMAGE

This application is a continuation of an application, Ser. No. 500802, filed Mar. 28, 1991 now abandoned.

FIELD OF THE INVENTION

This invention relates to the field of machine readable symbols, and particularly to a method and apparatus for high speed omnidirectional reading of bar code symbols.

BACKGROUND OF THE INVENTION

Various machine readable symbols have been developed for many applications. For example, the Universal Product Code (UPC) is a bar code symbology widely used in the U.S. retail industry to identify products at the point of sale, or for inventory control purposes. In the industrial area, other bar code symbologies have been used for package identification systems. Common bar code symbologies include CODABAR, Code 39, Interleaved 2 of 5, and Code 49. In general, machine readable codes provide significant advantages in the efficiency of material handling and data gathering.

A bar code is a particular type of machine readable symbol. A typical bar code includes parallel solid lines, or bars, of varying width and spacing. The alternating light and dark areas defined by the bars and the spaces between the bars, represent a digital code which serves to identify the content of the bar code symbol. After being read, the digital code is then directly translated to a sequence of alphanumeric characters and then by means of a data base, may be further translated to the common language description of the item bearing the subject bar code label, along with other pertinent data, such as for example the current price of the item.

A bar code may be read by scanning. Typically, a small spot of light is directed from a source of illumination to the surface of the bar code. The reflected light is sensed by a photosensitive element. The small illuminated spot of light is then swept across the bar code surface, all the while sensing the intensity of the resulting reflected light. Since light areas reflect more light than dark areas, the reflected light intensity represents the digital code which serves to identify the content of the bar code symbol.

In one type of bar code reader, a hand held laser or LED is used as the source of illumination, and the reader is manually swept across the bar code surface. In a scanning type of bar code reader, the light source is stationary while the light beam is moved in a scanning pattern. A typical scan pattern may be a linear bidirectional sweep. In the latter type of scanner, the bar code symbol and the bar code reader must still be manually oriented so that the scan pattern traverses all the bars of the bar code in order for the bar code to be properly scanned and read.

In another type of bar code scanner, a laser beam is swept through a complex series of repetitive geometric patterns in order to provide for some degree of omnidirectional scanning. All omnidirectional laser based scanners tend to be expensive due to the initial cost and limited lifetime of the laser light source, and the associated complex optical elements which typically include rapidly rotating polygonal mirrors. Also, laser based scanners use an intense concentrated light source which can be an eye hazard, and which requires special precautions in manufacturing and use.

Finally, omnidirectional laser scanners tend to perform poorly with bar code symbols which have been damaged b abrasion, dirt, printing defects, and the like. This latter limitation is caused by scan patterns which are likely to sweep through the bar code label only once as it passes under the scanner. If the laser sweep cuts through a damaged area of the bar code label, a misread (or no read) will occur. Additionally, omnidirectional laser scanners do not read low aspect ratio bar codes because of the limited number of scanning angles in the scan pattern. Also, omnidirectional laser scanners cannot read stacked bar codes such as code 49.

In another type of bar code reader, an image of a bar code is formed over a one dimensional array of photosensitive elements. The one line photosensitive array is subsequently serially read out to simulate a scan line through the bar code. In yet another type of bar code reader, two dimensional image of a bar code is formed on a two dimensional array of photosensitive elements, and subsequently stored in a memory for further processing. However, in such prior art bar code readers, it has still been necessary to position and orient the bar code to the reader.

In general, in the prior art, it is typically necessary for the operator to either orient the bar code, or otherwise position the bar code and/or the reader manually in order to achieve proper operation. Also, prior art bar code readers have difficulty reading damaged labels, and stacked or multiple bar codes. The common result of these limitations, is misread bar codes or unread bar codes, even after repeated attempts. If unable to successfully scan the bar code, the data must be read and entered manually. In some cases, the bar code symbol will pass the scanning station completely undetected and unread. In any event, due to the limitations of the prior art bar code readers, the benefits of marking products with machine readable symbols is reduced or lost.

SUMMARY OF THE INVENTION

The present invention is embodied in a bar code reader in which bar codes are rapidly and reliably read. Furthermore, a bar code reader in accordance with the present invention provides for high speed omnidirectional reading of multiple or stacked bar code symbols, or even damaged bar code labels, which may be at a random orientation, distance and relative motion with respect to the reader.

A bar code reader in accordance with the present invention includes 1)means for capturing and storing a two dimensional image in memory storage, which stored image includes a bar code symbol somewhere within the field of view, 2)detecting means for processing the stored image for detecting a potential location, or locations, anywhere within the field of view of the stored image, each of which locations being likely to contain a bar code symbol, 3)orientation processing means for determining the orientation of said detected bar code symbol at said detected location likely to contain a bar code symbol, 4)filtering means for filtering said detected bar code symbol in a direction perpendicular to said determined orientation of said detected bar code symbol in order to utilize the redundancy of the bar code symbology, and 5)means for scanning through said detected bar code symbol at a location corresponding to said detected potential location and at an angle substantially corresponding to said determined orientation of said detected bar code symbol.

It is noted that various combinations of the above five elements, i.e. image capture, detection of likely bar code location, determination of bar code orientation, bar code filtering, and bar code scanning, may be totally or partially combined into composite operations. For example, the detection of likely bar code locations and the coarse determination of bar code orientation may be performed at the same time. Bar code fine orientation and filtering ma be performed in a composite operation as well. Moreover, bar code filtering and bar code scanning may be performed in a combined processing step.

It is further noted that although four of the above identified elements. i.e. bar code image capture, location, orientation and scan are operations needed for omnidirectional bar code reading, bar code filtering is optional. For example, in some applications it may be sufficient to rely on one or more successful scans once the bar code symbol is located and properly oriented.

However, it is desirable that the total image processing be divided into at least two phases, in which the first processing phase permits a large amount of image area to be processed in a short amount of time, and in which the second processing phase is relatively more intensive and more concentrated. During the first processing phase, some areas of the stored image may be identified as likely to contain a bar code symbol. In such case, the second processing phase operates only on those portions of stored image which have been identified as likely to contain a bar code. Although the second processing phase involves more intensive processing, relatively smaller image area is needed to be processed during the second processing phase due to the selective identification of the image areas likely to contain bar codes during the first processing phase.

DETAILED DESCRIPTION

Figure 1:
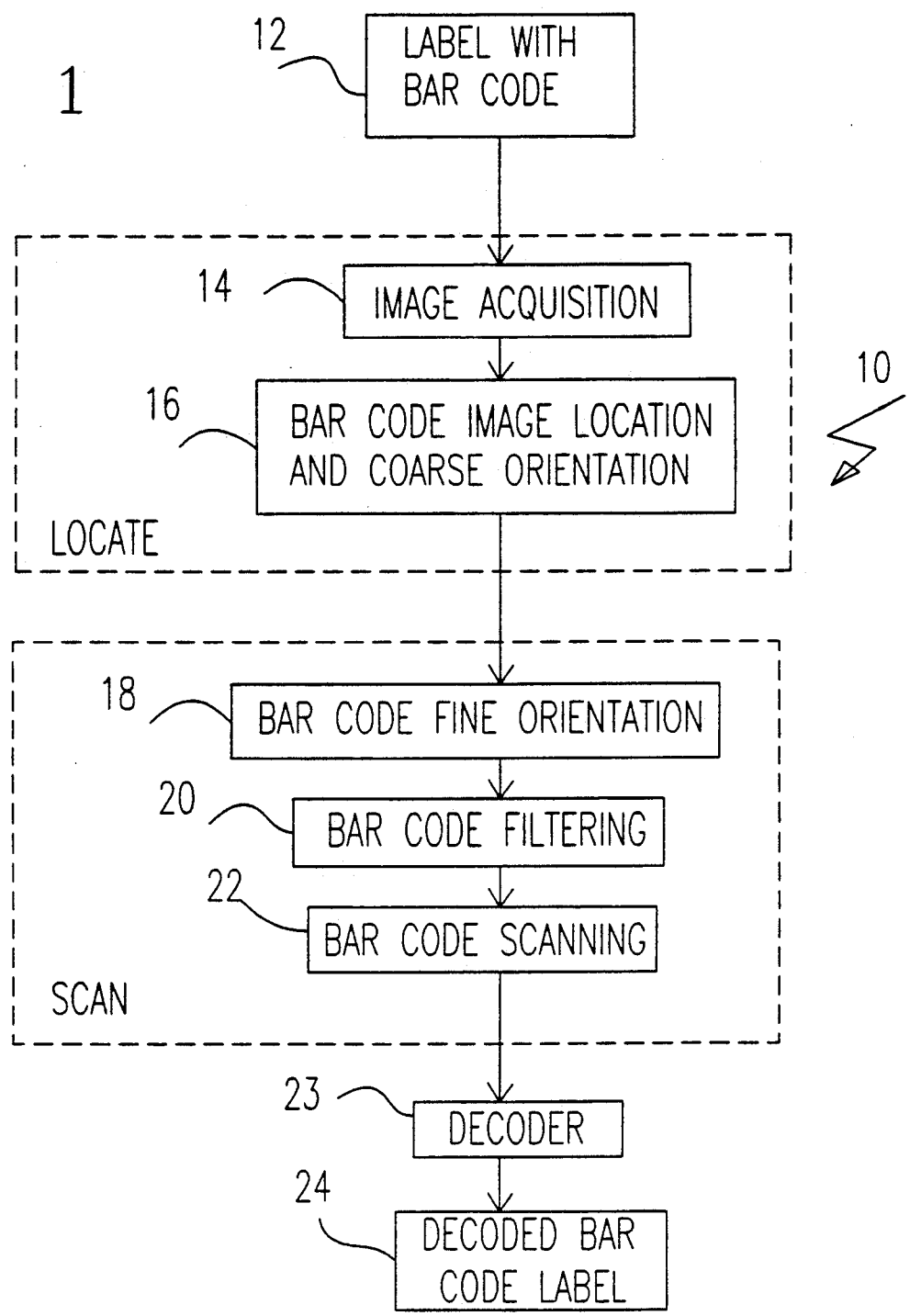
FIG. 1 is a block diagram, partially in flow chart form, indicating a method and apparatus in accordance with the present invention.

A brief overview of a bar code reader in accordance with the present invention is shown in FIG. 1. An image acquisition system 14 which includes the necessary optical and photosensitive elements, captures an image of the reader's field of view, which captured image may contain a bar code label 12.

Once the image is acquired in memory, means are provided for bar code image location and coarse orientation 16. Together, image acquisition 14 and bar code image location and orientation 16 comprise the portion of the present bar code reader which serves to generally locate a bar code within a field of view.

After the bar code image is located within the field of view and its coarse orientation determined, means 18 are provided for determining the fine orientation of the bar code. Having located the bar code and determining its fine orientation, means 20 for filtering the bar code, are provided. Thereafter, bar code scanning 22 is performed. The operation of determining the fine orientation 18, bar code filtering 20, and bar code scanning 22, together comprise the portion of the present bar code reader which serves to "scan" a bar code once having been located within a field of view. After bar code scanning, a decoder 23 well known to those skilled in the art, provides the decoded bar code label output 24.

The operation of "scanning a bar code", as used in the prior art, relates to sweeping an illuminated spot across a bar code. As used herein, with respect to the present invention, the operation of "scanning a bar code" means to extract from image memory storage, sequential values derived from said image memory storage corresponding to reflectivities along a sweep traversing the bar code.

Figure 2:
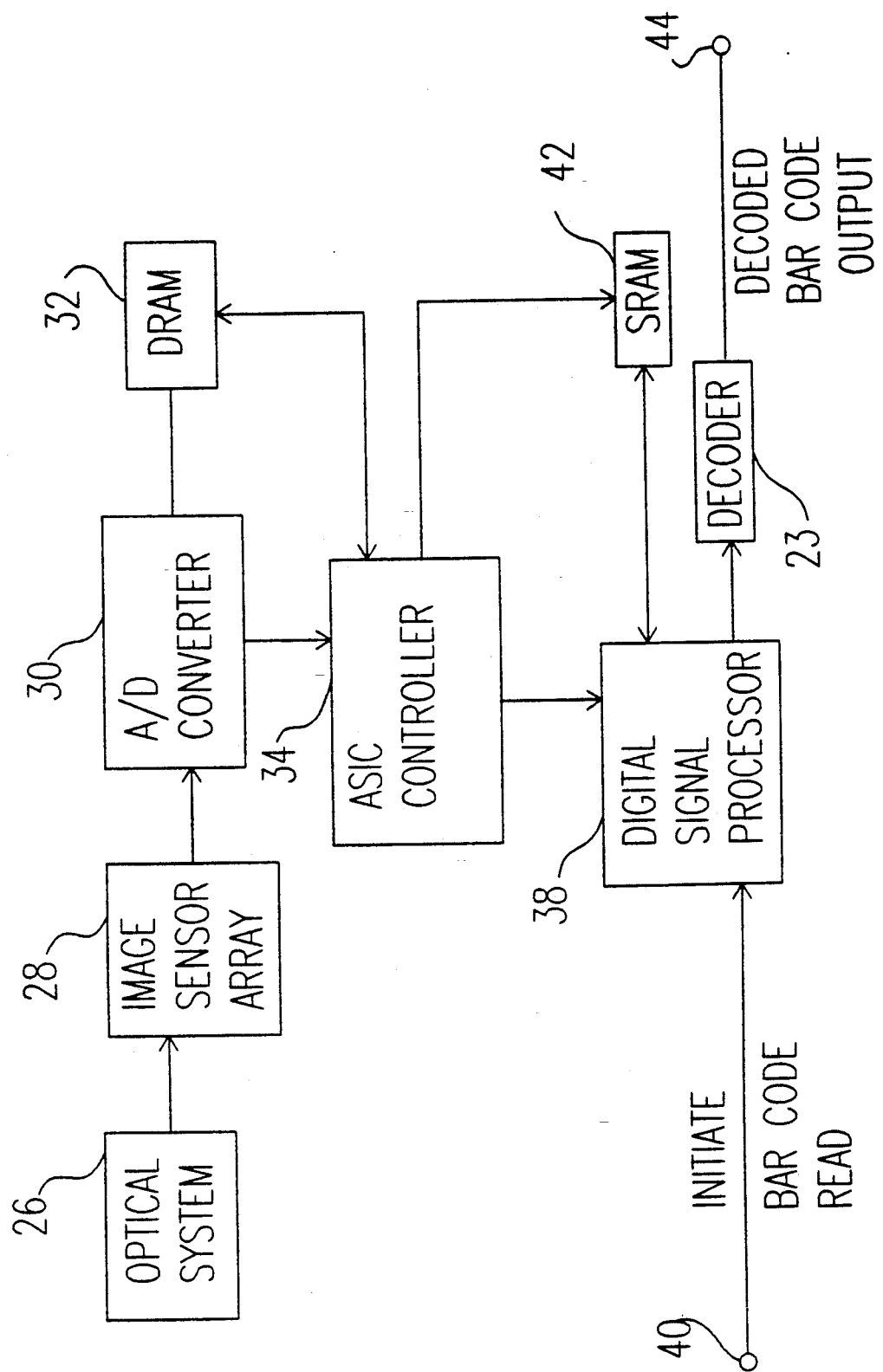
FIG. 2 is a block diagram of a system for a bar code reader in accordance with the present invention.

A preferred hardware embodiment of the present invention is shown in FIG. 2. An optical system 26 is coupled to an image sensor array 28. The output of the image sensor array 28 is converted from analog to digital in A/D converter 30, and stored in a first memory 32. The first memory 32 is preferably a dynamic random access memory (DRAM). A controller 34 which may be an application specific integrated circuit (ASIC) controls the image acquisition system so as to capture and digitize an image and store it in DRAM 32. The ASIC controller 34 also performs several other processing tasks under the control of a digital signal processor 38. Digital signal processor 38 is typically a high speed microprocessor such as the ADSP-2101 available from Analog Devices, Norwood, Mass. The memory space for digital signal processor 38 is both ROM for program storage, and static random access memory 42 (SRAM) for image processing storage. Portions of the stored image memory in DRAM 32 are transferable to SRAM 42 under the control of ASIC controller 34. Finally, an input terminal 40 is coupled to the input of digital signal processor 38, and an output terminal 44 is coupled to a decoder 23, which is coupled to the output of digital signal processor 38.

In operation, a bar code read is initiated by an input signal on terminal 40 to digital signal processor 38. Responsive to the control outputs of digital signal processor 38, ASIC controller 34 acquires an image for storage in DRAM memory 32. Also responsive to the control outputs of digital signal processor 38, ASIC controller 34 processes the stored image in DRAM 32 so as to determine the potential location or locations which are likely to contain a bar code symbol. For location processing, the image stored in DRAM 32 is divided into smaller areas, or cells, and a location score is assigned to each cell. The higher the location score for a given cell, the more likely is the cell to contain at least a partial bar code symbol.

When the ASIC controller 34 has completed its location scoring task, digital signal processor 38 examines the resulting scores and commands the ASIC controller 34 to transfer those image areas of interest from DRAM 32 to SRAM 42. Digital signal processor 38 thereafter processes the partial image in SRAM 42 to determine the orientation of the stored bar code image, to filter the oriented bar code image along a direction perpendicular to the determined orientation, and to scan the oriented and filtered bar code image. After all areas of interest have been transferred from DRAM 32 to SRAM 42 and processed by digital signal processor 38, a complete bar code output scan is provided to decoder 23 which provides a decoded bar code label output at terminal 44. Alternatively, the function of decoder 23, which may have a serial or parallel output, may be included in the programming of digital signal processor 38.

On the other hand, if by examination of the location scores, no bar code was found in the stored image in DRAM 32, then digital signal processor 38 through ASIC controller 34 may command the optical system 26, the image sensor array 28 and the A/D converter 30 to acquire another image in DRAM 32 for processing. The process of acquiring and processing images may continue until a bar code symbol is successfully scanned.

Figure 3:
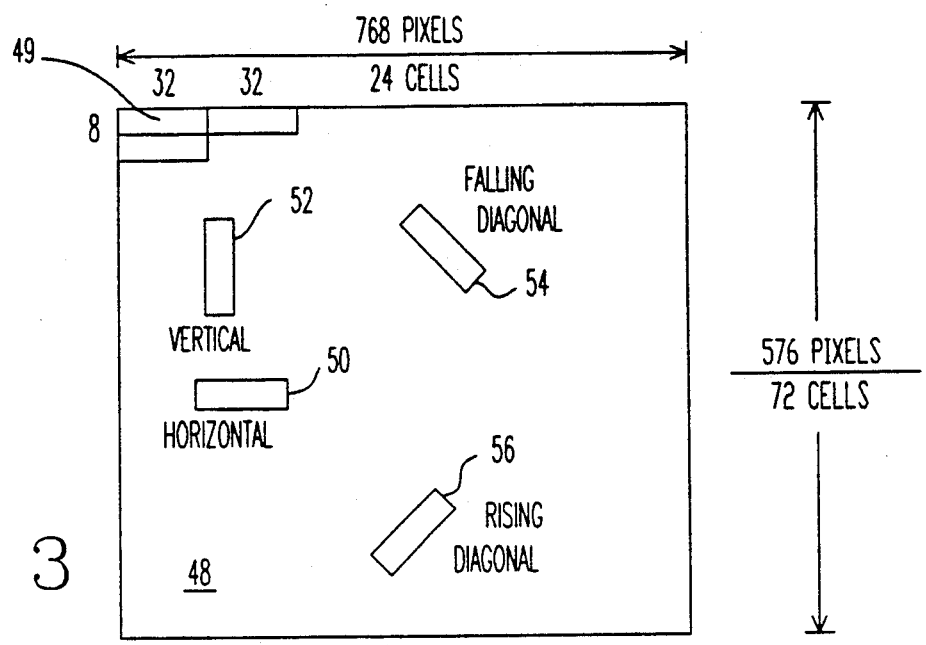
FIG. 3 is a graphical representation of a two dimensional image area illustrating individual cells used in determining location and orientation of a bar code symbol in accordance with the present invention.

The organization of the stored DRAM image area 48 is shown in FIG. 3. The image sensor array 28 (FIG. 2) has 768 pixels in the horizontal direction and 576 pixels in the vertical direction. A suitable image sensor for use with the present invention is the MOS image sensor array 98268 available from Hitachi Corporation. The image area 48 is conceptually divided into cells, such as cell 49. Specifically, the image area 48 is divided into 24 cells in the horizontal direction and 72 cells in the vertical direction, with each cell being 8 by 32 pixels. That is, each cell has 8 scan lines, with each scan line having 32 pixels.

The image area 48 is divided into cells in each of four directions. That is, image area 48 is divided into horizontal cells such as cell 50. However, image area 48 is also divided vertical cells such as cell 52. Similarly, image area 48 is divided into cells along a rising diagonal i.e. 45 degrees such as cell 56. Finally, image area 48 is divided into cells along a falling diagonal i.e. 135 degrees such as cell 54. Using four directions of scan lines permits the location process to also determine the coarse orientation of the located bar code image in the same operation.

Figure 3A:
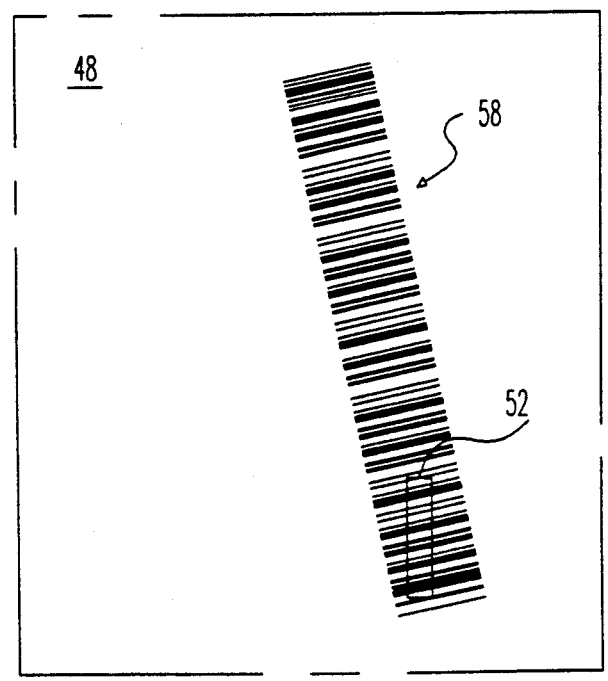
FIG. 3A is a representation of a portion of the image area of FIG. 3, which portion contains a bar code symbol.

For purposes of illustration, FIG. 3A shows a bar code symbol somewhere within the field of view of image area 48 and oriented 14 degrees off the vertical direction. A typical vertical cell 52 is shown superimposed over a portion of bar code symbol 58.

Figure 4:
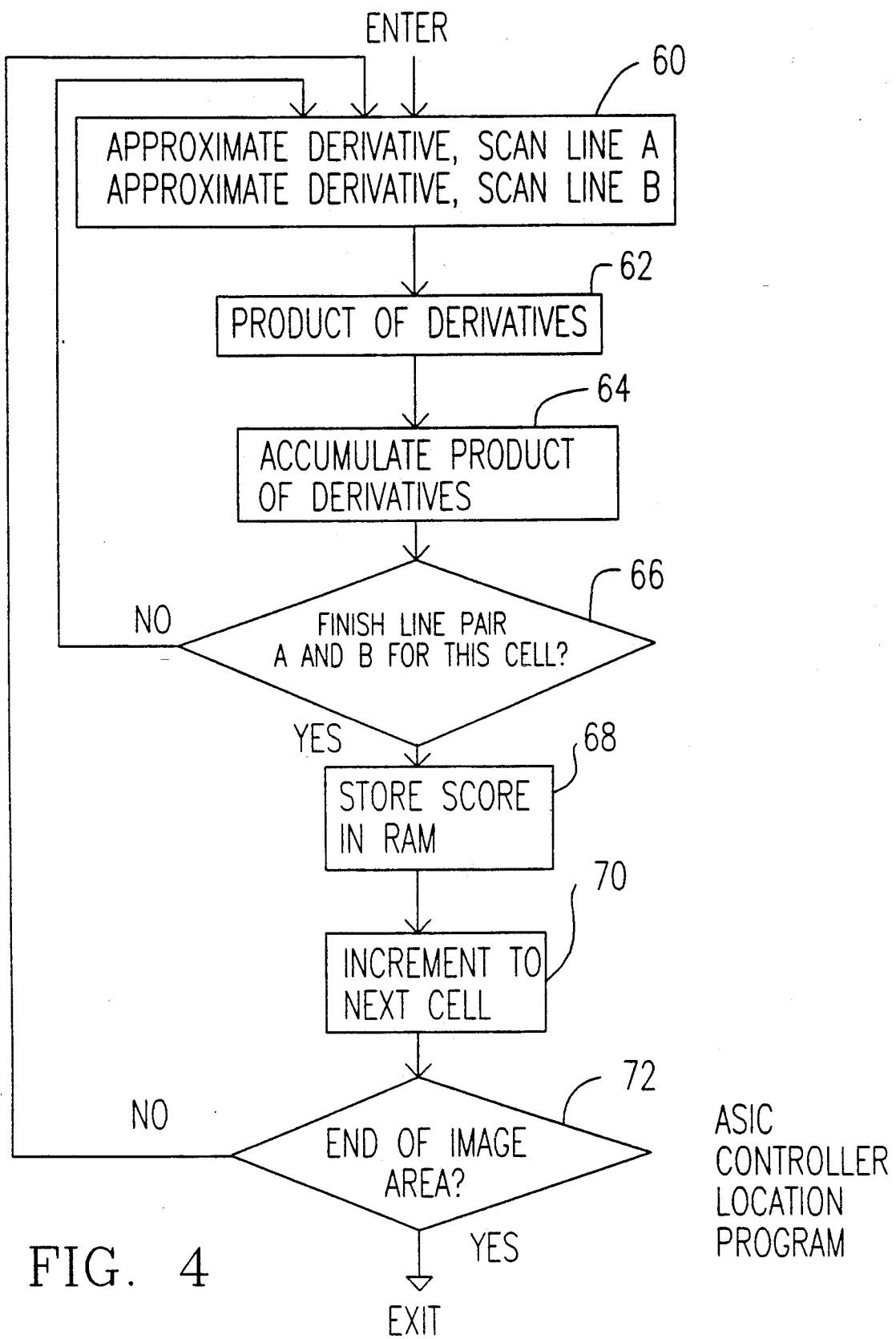
FIG. 4 is a flow chart illustrating the control program for the ASIC controller of FIG. 2, in accordance with the present invention.

The portion of the program of the ASIC controller 34 (FIG. 2) for determining the location or locations likely to contain a bar code symbol is shown in the flow chart of FIG. 4. For a given cell in image area 48, the process uses two scan lines, i.e. scan line A, and scan line B. Specifically, scan line A is the first of the eight scan lines of a given cell, and scan line B is the fifth scan line of a given cell. After entering the location program, the approximate derivative of scan line A, and the approximate derivative of scan line B, are calculated at step 60. For this purpose, a derivative is approximated by taking the difference between any two consecutive pixels. In order to speed up the process of taking an approximate derivative, every other pixel is used in the calculation, i.e. instead of using all 32 pixels across a scan line of a given cell, every other pixel i.e. 16 pixels are used to approximate a derivative.

After finding the approximate derivatives at each point o scan line A and scan line B at step 60, the point by point product of both derivatives is calculated at step 62. Thereafter, the sum of the products of derivatives is accumulated at step 64. This process of accumulating the sum of the product of derivatives continues until all the points of scan lines A and B are completed for this cell at step 66. At this point, the accumulated product of derivatives constitutes the location score for this particular cell. The location score is then stored in SRAM at step 68. The program increments to the next cell in the image area at step 70. The process of computing location scores continues from cell to cell until the end of the image area is detected at step 72, and the program is exited.

Figure 6A:
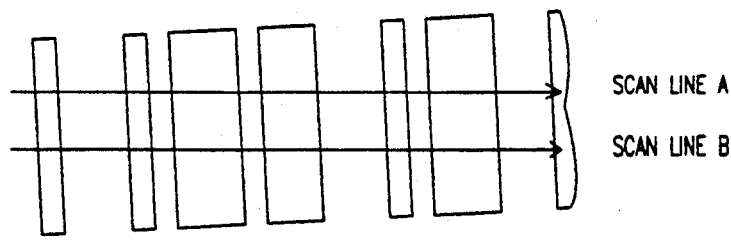
FIG. 6A is a representation of a bar code symbol with two typical parallel scan lines, which may be utilized in conjunction with the embodiments of the present invention.
Figure 6B:
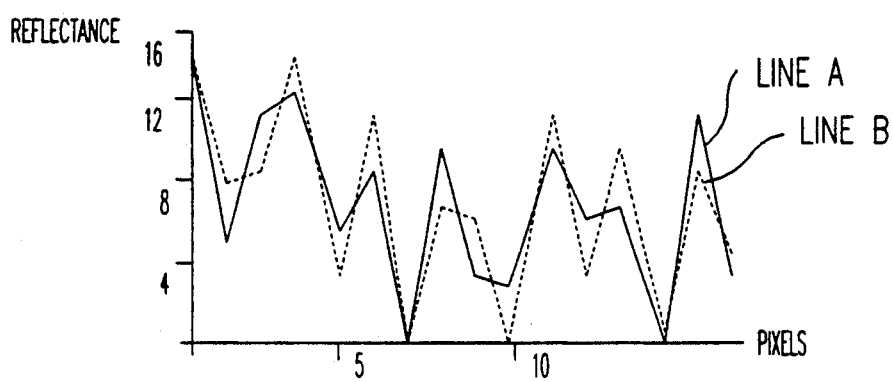
FIG. 6B illustrates the reflectance signals from the two parallel scan lines of FIG. 6A.
Figure 6C:
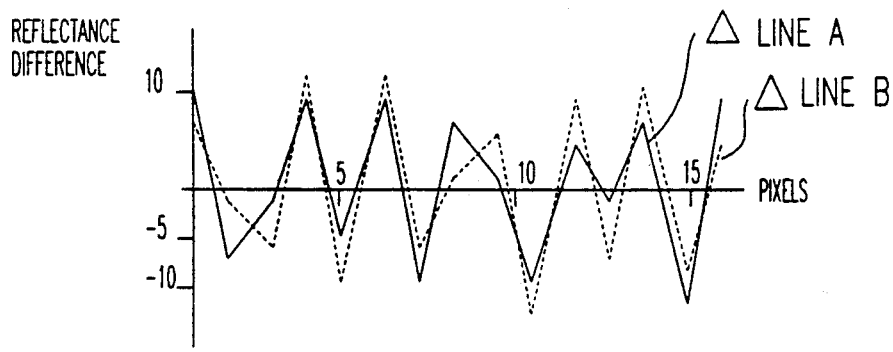
FIG. 6C represents the signal differences between successive data points along each of the two respective scan lines of FIG. 6B utilized in the present invention.
Figure 6D:
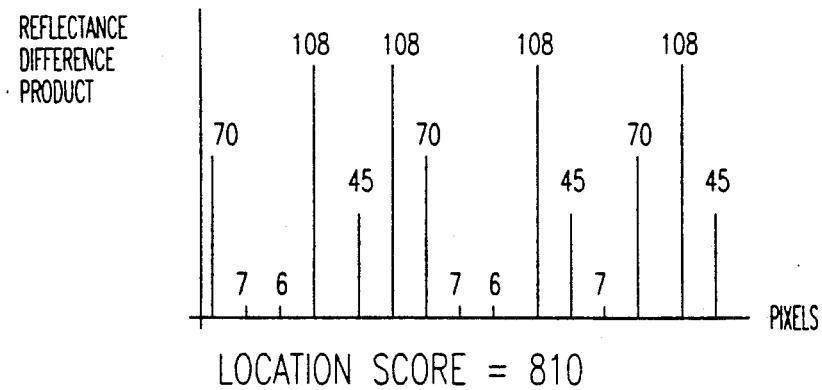
FIG. 6D illustrates the products of the signal differences for each of the respective data points for the signal differences shown in FIG. 6C, and the sum total of all products of the signal differences along two parallel scan lines utilized in conjunction with the present invention.

The process of computing a location score for a cell is illustrated in FIGS. 6A through 6D. In FIG. 6A, scan line A and scan line B are shown at a slight angle across a portion of a bar code symbol. FIG. 6B shows the reflectance signals at approximately 1.5 pixels per narrow bar for both scan line A and scan line B. The data points are simply connected by straight lines. FIG. 6C shows the result of taking the difference between successive data points along scan line A and successive data points along scan line B to produce an approximate derivative shown as delta scan line A and delta scan line B, respectively. FIG. 6D shows the product of each data point along delta scan line A and the corresponding data point along delta scan line B. Thus, each score in FIG. 6D for each data point is the product of the approximate derivatives of each respective data point of scan line A and scan line B. Adding up the sum of the derivatives produces a location score equal to 810, which is a relatively high score because scan line A and scan line B are directly through a bar code symbol.

Figure 7A:
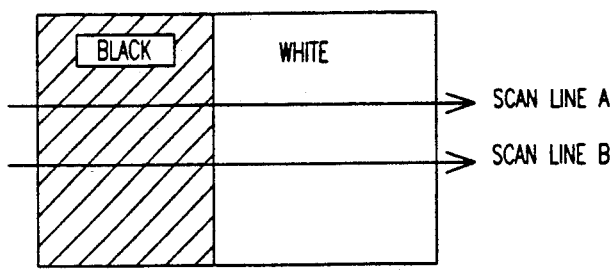
FIG. 7A is a representation of a black to white transition with two typical parallel scan lines, which may be distinguished from a bar code symbol in conjunction with the present invention.
Figure 7B:
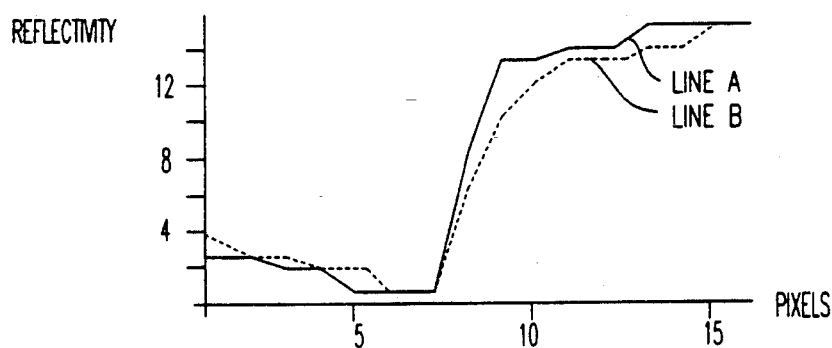
FIG. 7B illustrates the reflectance signals from the two parallel scan lines of FIG. 7A.
Figure 7C:
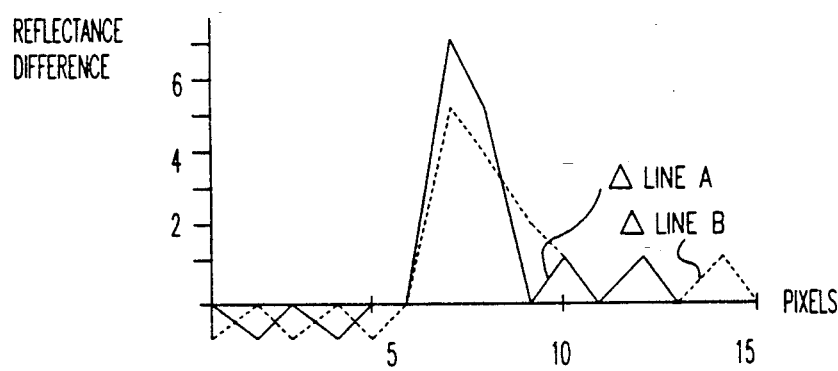
FIG. 7C represents the signal differences between successive data points along each of the two respective scan lines of FIG. 7B utilized in the present invention.
Figure 7D:
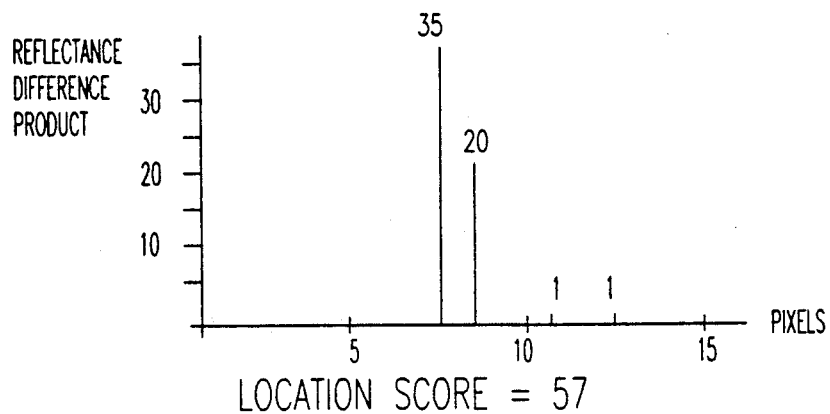
FIG. 7D illustrates the products of the signal differences for each of the respective data points for the signal differences shown in FIG. 7C, and the sum total of all products of the signal differences along two parallel scan lines utilized in the present invention.

To illustrate the ability of the location algorithm to distinguish bar codes from simple transitions between black and white areas, FIGS. 7A through 7D indicate the corresponding location score for a simple black to white transition. FIG. 7A shows an image with a black to white transition with two scan lines, scan line A and scan line B therethrough. FIG. 7B shows the reflectance signals for scan line A and scan line B. FIG. 7C shows the approximate derivative or delta scan line A and delta scan line B, while FIG. 7D shows the product of the derivatives for each point on both scan line A and scan line B. The resulting location score of 57 from FIG. 7D for the image in FIG. 7A is considerably less than the location score of 810 for the bar code in FIG. 6A.

Figure 5A:
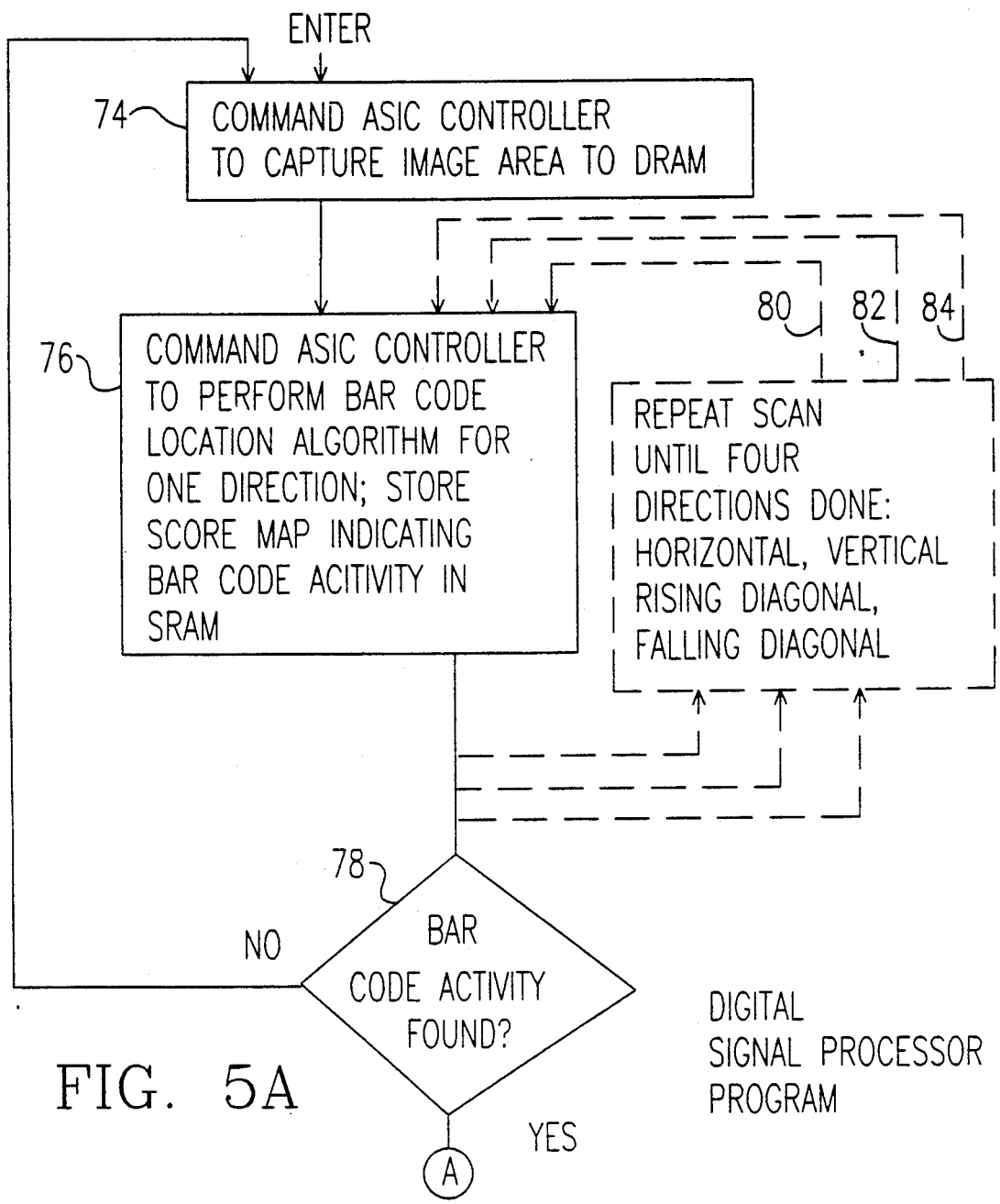
FIGS. 5A and 5B show a flow chart illustrating the control program for the digital signal processor of FIG. 2, in accordance with the present invention.
Figure 5B:
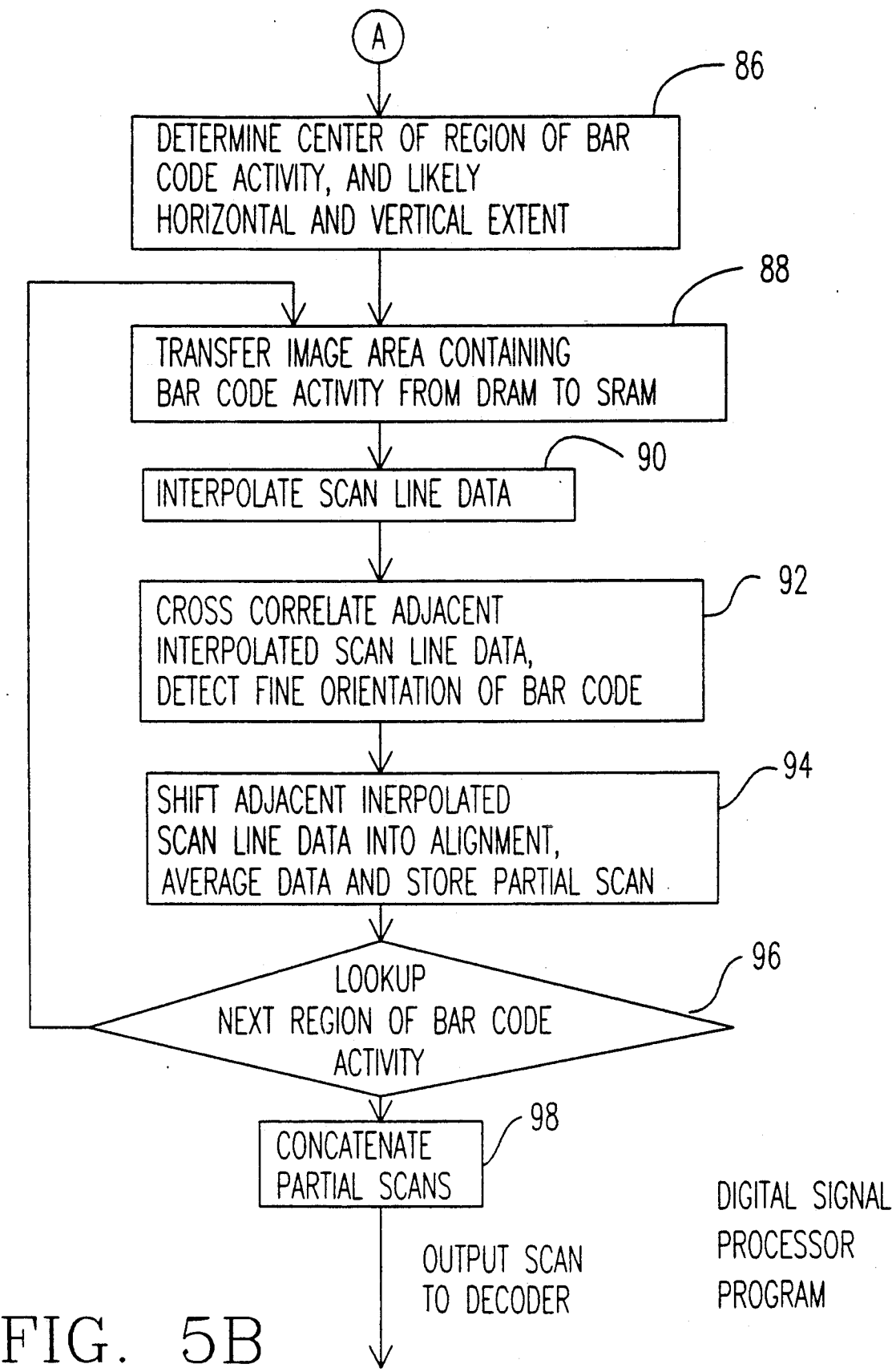

The program flow chart for the digital signal processor 38 in FIG. 2, is shown in FIGS. 5A and 5B. Responsive to an input signal on terminal 40 of FIG. 2, to initiate a bar code read, the digital signal processor 38 enters the program as shown in the flow chart of FIG. 5A. The first step 74, is to command the ASIC controller to capture the image area to DRAM. Once the image area is captured, the next step 76 is to command the ASIC controller to perform the bar code location algorithm (in accordance with the flow chart of FIG. 4, discussed above) for one direction i.e. the horizontal direction. As the location algorithm is performed for all cells in the horizontal direction in image area 48, the ASIC controller stores the results in SRAM. Each cell score is an indication of the likelihood of bar code activity The complete set of scores for a given direction forms a map of the likely regions of bar code activity. This process is repeated for all four directions i.e. location scores for a vertical scan are computed and stored in SRAM through program loop 80; location scores for a rising diagonal scan, i.e. a 45 degree scan, are computed and stored in SRAM thorough program loop 82; and location scores for a falling diagonal scan, i.e. a 135 degree scan, are computed and stored in SRAM thorough program loop 84.

Once the cell activity score map for a particular direction has been computed and stored in SRAM, the digital signal processor program determines whether or not bar code activity is present at step 78. For this purpose, a simple threshold may be utilized, examining all location scores that exceed a given threshold. If no score exceeds a given threshold, then no bar code activity is found, and the program repeats starting from step 74 in which the ASIC controller captures a new image area to DRAM. However, if bar code activity is detected at step 78, the subsequent digital signal processor program, in accordance with the flow chart of FIG. 5B, proceeds to orient, filter, and scan the located bar code.

The first step is to determine from the location scores stored in SRAM, the center of the region of bar code activity, and the likely horizontal and vertical extent of such activity, at step 86. The approximate center and extent of bar code activity may be determined by region growing applied to the cell activity score map. Region growing is a common image processing task to identify a particular region of an overall image which particular region possesses a specific characteristic, in this case, large values. Region growing is a technique well known to those skilled in the art of image processing, and is disclosed in "MATRIX STRUCTURED IMAGE PROCESSING" by Dougherty and Giardina, published 1987 by Prentice-Hall Inc, Englewood Cliffs, N.J. 07632.

After the region of interest has been determined, the digital signal processor commands the ASIC controller to transfer the image area containing bar code activity from DRAM to SRAM at step 88. SRAM memory space is generally smaller than DRAM memory space, and typically represents a few percent of the total image area stored in DRAM. Although SRAM is generally faster than DRAM, the use of a relatively smaller SRAM is more economical since the cost of SRAM is typically more than DRAM. Also, the area of the image stored in SRAM may or may not be related to the size of the cell areas from the DRAM image memory. Due to the smaller size of the SRAM, the latter may hold only a portion of a bar code, in which case processing steps are repeated for partial scans and the partial scans later combined to form a complete scan.

Once the image is transferred to SRAM memory, the digital signal processor interpolates each of the scan lines of data for a given image area of interest at step 90. The process of interpolation is well known to those skilled in the art of digital signal processing, and is described by Peled and Liu in "DIGITAL SIGNAL PROCESSING theory, design, and implementation", published 1976 by John Wiley and Sons. Interpolation increases the effective sampling rate of the scan line data by fitting the best curve to the data with frequencies below the Nyquist limit.

The bar code image is initially sampled at about 1.5 pixels per narrow bar. To create a smoother curve, the signal is upsampled by four times. In simple terms, rather than connecting the data points by straight lines, additional data points are added between the actual data points to form a smoother curve.

After interpolating each of the scan lines at step 90, the first scan line of a given cell is cross-correlated with successive adjacent interpolated scan line data as indicated in step 92. Cross-correlation provides a measure of the similarity, or match, between two curves. Techniques for cross-correlating two signals are well known to those skilled in the art, and a discussion of cross-correlation may be found in "DIGITAL PROCESSING OF SPEECH SIGNALS" by Rabiner and Schafer published 1978 by Prentiss Hall, Englewood Cliffs, N.J. 07632.

Successive cross-correlation between adjacent interpolated scan line data provides a means to determine the fine orientation of the bar code symbol also at step 92. The detected fine orientation of the bar code is derived from the difference between the average peaks of successive cross-correlations between adjacent interpolated scan lines. The position of the peak of the cross-correlation function of two scan lines represents the amount one scan line of data must be shifted in order to provide the best alignment with the other scan line of data. Calculation of the actual angle of the bars is discussed below in relation to FIG. 9A through FIG. 9C.

After the fine orientation of the bar code is known, each interpolated scan line data is shifted into alignment at step 94. After the interpolated scan line data has been shifted into alignment, the average of all scan lines is computed. At this point, the bar code symbol may be decoded into a partial bar code scan at step 94.

The partial bar code scan is stored at step 94, and the next stored region of interest is determined at step 96. That is, the next area of interest which is likely to contain a bar code image is then transferred from DRAM to SRAM at step 88. The process of interpolation and cross-correlation is repeated until another partial bar code scan, representing an adjacent image area of interest, is stored.

Once all of the stored regions containing bar code activity have been scanned, the partial scans are concatenated, or connected to form a complete scan at step 98. Finally, at step 98 the output scan is forwarded to a decoder, known to those skilled in the art, for converting the complete concatenated bar code scan into a sequence of alphanumeric characters which represent the content of the bar code.

Figure 8A:
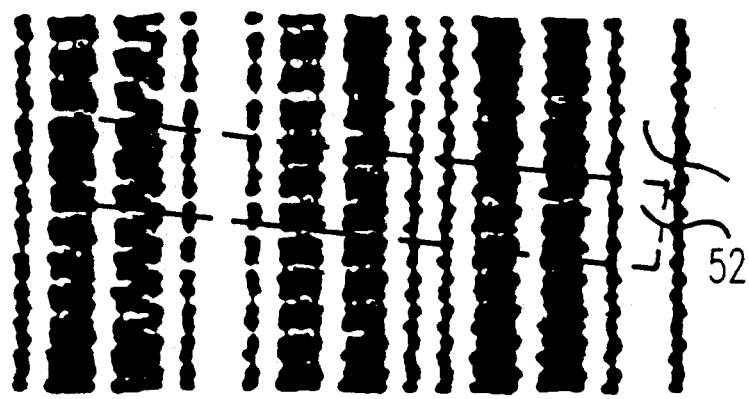
FIG. 8A is an image of a bar code symbol at an angle to the direction of scan with a portion of the scanned area indicated.

FIGS. 8A through 8G and FIGS. 9A through 9C illustrate the processes for detecting fine orientation, filtering and scanning of a bar code that has been located in a given cell. Specifically, FIG. 8A illustrates a vertical cell 52 consisting of 8 scan lines superimposed over a portion of a bar code label 58. The poor appearance, or spottiness of the bars is actually representative of the condition of many printed bar code labels encountered in practice.

Figure 8B:
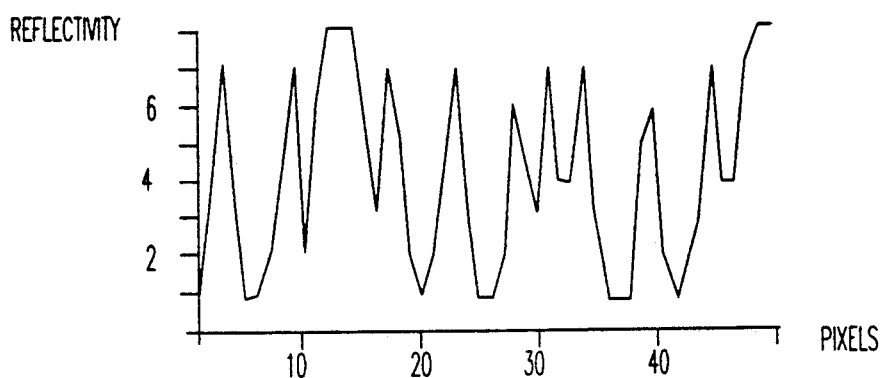
FIG. 8B illustrates the reflectance signal from one scan line of the scanned area indicated in FIG. 8A.
Figure 8C:
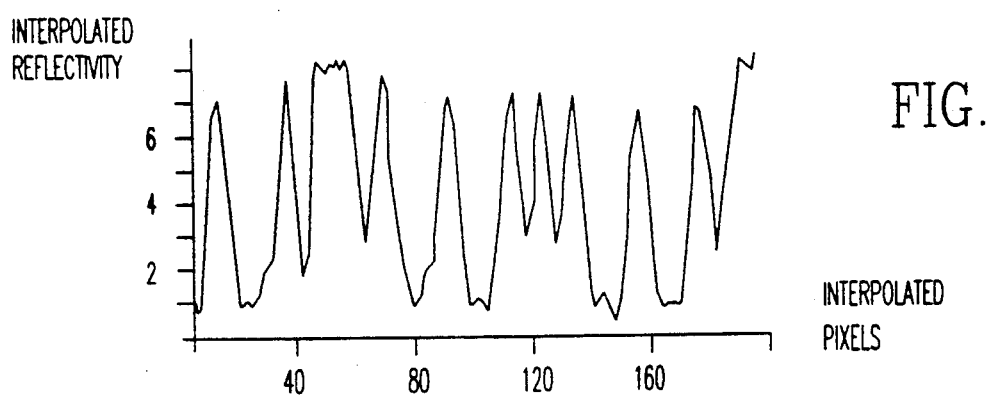
FIG. 8C illustrates the scan line of FIG. 8B after processing by interpolation.
Figure 8D:
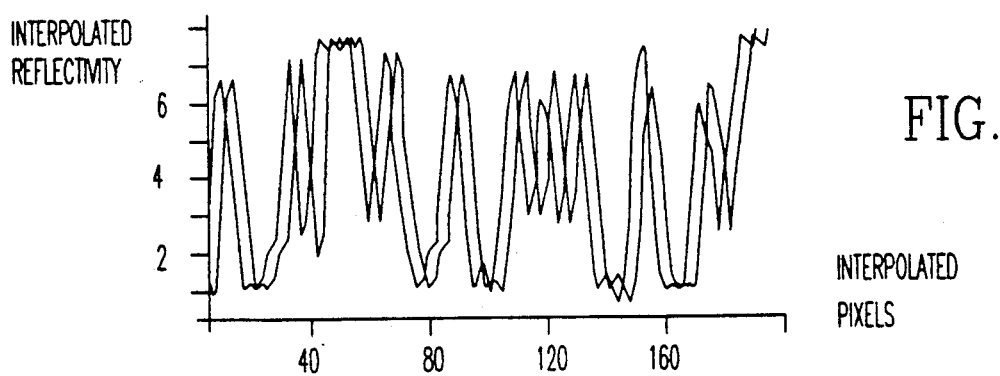
FIG. 8D shows one interpolated scan line and another interpolated scan line, four scan lines apart.

FIG. 8B shows the 32 pixels of the first scan line of cell 52 connected by straight lines. FIG. 8C shows the same 32 data points after interpolation, or upsampling by four times. FIG. 8D shows one upsampled scan line, and another upsampled scan line which is 4 scan lines away. It is evident there is an offset between the two waveforms. This offset is indicative of the orientation offset of the bars.

Although the offset is visibly apparent in FIG. 8D, it is necessary to compute the magnitude of the offset, i.e. the actual orientation angle of the bars. The cross correlation function is well suited for this task.

Figure 9A:
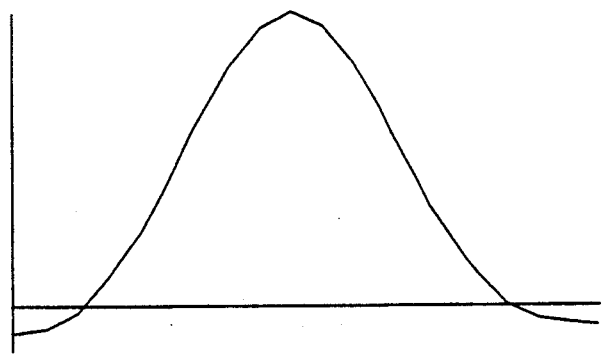
FIG. 9A is the cross-correlation function of the interpolated first and second scan lines of the portion of the scanned area in FIG. 8A.
Figure 9B:
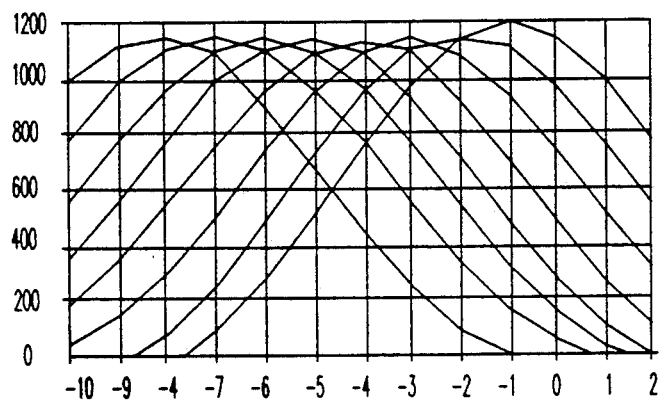
FIG. 9B is a family of cross-correlation curves, each resulting from cross-correlating the first interpolated scan line with successive interpolated scan lines of the portion of the scanned area in FIG. 8A.
Figure 9C:
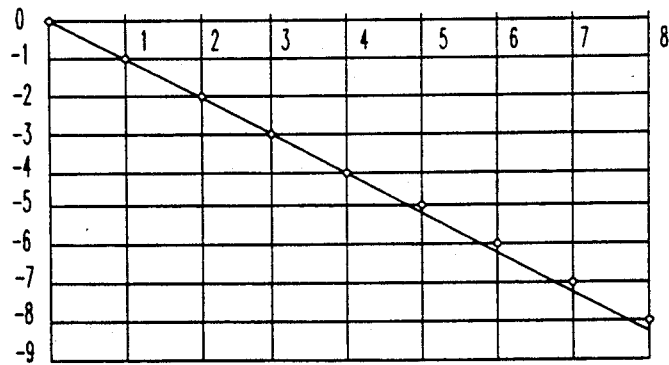
FIG. 9C shows the peak values of the cross-correlation function for each interpolated scan line compared to the first interpolated scan line for the portion of the scanned area indicated in FIG. 8A.

FIGS. 9A through 9C illustrate the process of determining the fine orientation of the bar code symbol. FIG. 9A shows the cross-correlation function of the first and second scan lines of the sampled signal. Note that the peak is at a lag of about minus one. This means that over a distance from one scan line to the next, the waveform is shifted one upsampled pixel, or one fourth of an original pixel. This yields a bar code slope of one fourth, or 0.25, which corresponds well with the measured slope of about 14 degrees, since the arctangent of 0.25 equals 14.036 degrees.

FIG. 9B shows a family of cross-correlation curves. Each curve is the result of cross-correlating the first scan line with the scan line successively further away. Note that the peaks step over extremely consistently by one for each curve. By using interpolation, it is possible to find the position of a peak in the cross-correlation function to fractional pixel accuracy. FIG. 9C is a plot of the cross-correlation function for each scan line compared to the first scan line of the given area of interest. Note that the calculated peak values lie almost perfectly along a straight line, the slope of which represents the fine orientation angle of the bar code symbol. In general, not all of the peak values may lie on a straight line, in which case the average slope may be taken to represent the fine orientation of the bar code symbol.

Figure 8E:
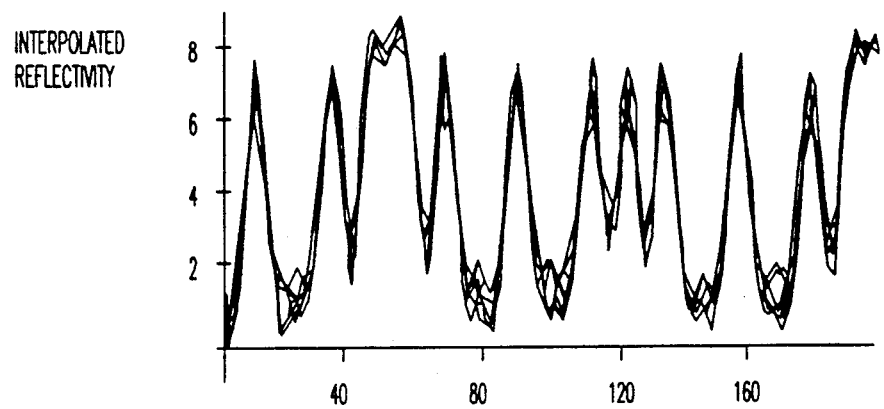
FIG. 8E shows eight interpolated scan lines which have been shifted respectively into alignment.
Figure 8F:
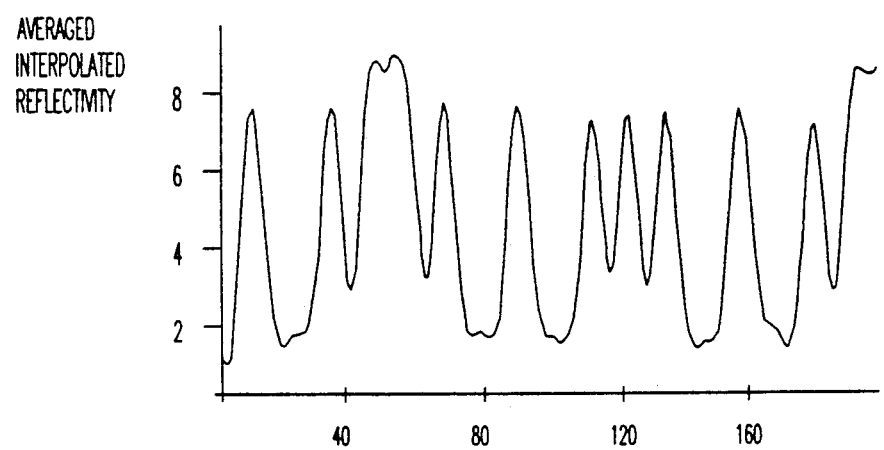
FIG. 8F shows the average of the eight interpolated and shifted scan lines of FIG. 8E.

Once the fine orientation of the bars is known, each of the interpolated scan line data is shifted into alignment as shown in FIG. 8E, and the average value taken as shown in FIG. 8F. Taking the average of corresponding sample points from the shifted lines of interpolated scan line data, provides a simple approach to bar code filtering. Averaging effectively filters perpendicular to the orientation of the bar code. In the alternative, the median value of each data point could be used to reduce the effect of occasional missing pieces of the bar code label. That is, a white spot on a black bar effects the median data value less than the average data value. Another approach is to take a weighted average based on cross-correlation scores to provide better rejection of poorly correlated scan line data. In the latter case, those interpolated scan lines that correlate well with each other would count more heavily in the average, while those interpolated scan lines which cross-correlate poorly would weight the average correspondingly less.

As used herein, "shifting" scan line data includes both actual shifting of scan line data within the image memory as well as virtual shifting of scan line data by the use of an offset vector to be added to the location of sequential values extracted from said memory.

It is further noted that bar code fine orientation may be achieved by cross-correlation of selected pairs of scan line data alone, without interpolation of scan line data if there are sufficient data points, or pixels per narrow bar. Otherwise, interpolation is used to generate the additional data points for the cross-correlation to be meaningful. Finally, in shifting scan lines into alignment, all successive scan line data may be correlated to a single reference line, or in the alternative, successive scan line data may be correlated in line pairs and not referenced to a single scan line.

Figure 8G:
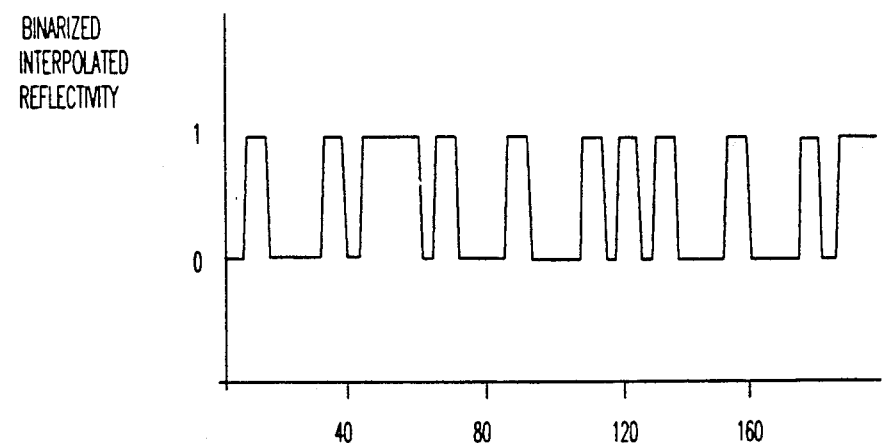
FIG. 8G is a binary signal representation of the waveform of FIG. 8F using the overall signal average a the binary threshold value.

The aggregate waveform in FIG. 8F is then converted to a binary value waveform as shown in FIG. 8G using the overall signal average as the binary threshold. The zero level of the waveform in FIG. 8G corresponds to the black level of the bar code in FIG. 8A, while the one level corresponds to the white level.

Figure 10:
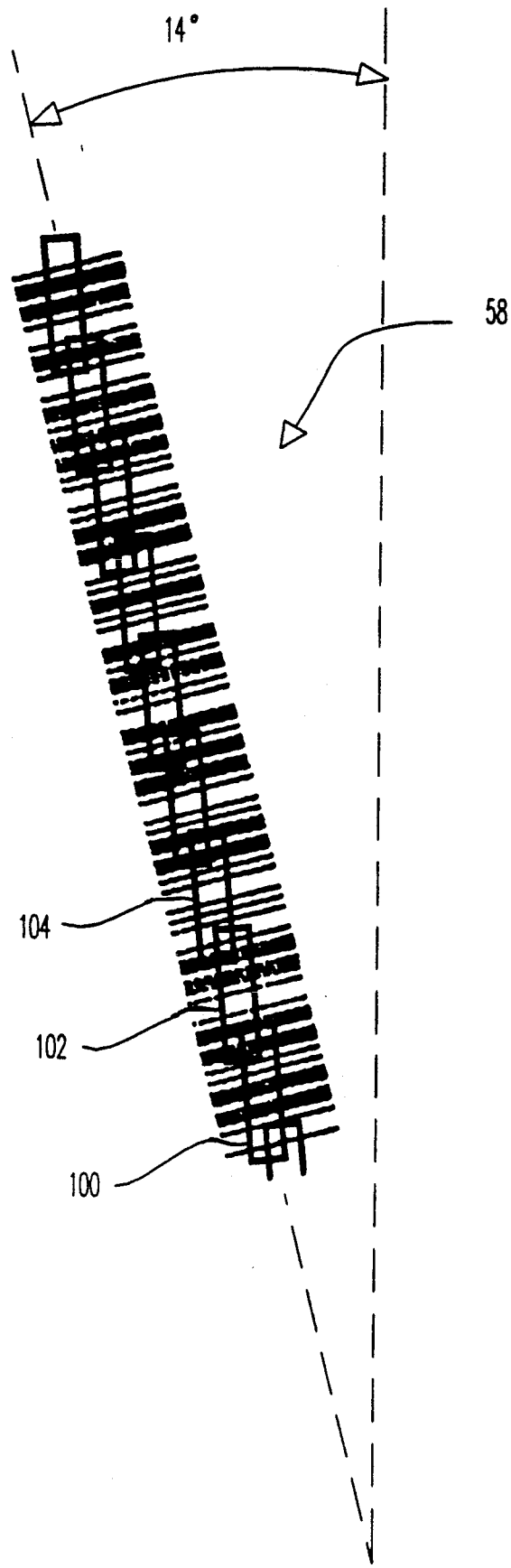
FIG. 10 is an illustration of a bar code symbol, depicting the manner in which overlapping partial scans are concatenated to form a complete scan.

Thus, a partial scan of the bar code shown in FIG. 8A corresponding to the cell 52 has been performed. FIG. 10 shows how successive partial scans 100, 102 and 104 may be concatenated to form a complete scan of bar code 58. The partial scans overlap each other so that no bar code data is lost. The successive partial scans are taken in steps along an angle corresponding to the measured fine orientation of the bars. That is, since the fine orientation of the bars is 14 degrees, a staircase of partial scans along a 14 degree angle off the vertical, is constructed in order to acquire partial scans which can be concatenated into a complete scan of the bar code label.

Thus, a bar code reader has been disclosed which is capable of reading a bar code symbol contained anywhere within the field of view of an image area in an omnidirectional manner. Although the embodiment disclosed suggests the use of an area image capture device, it will be appreciated that a linear image capture device as may be used with a moving conveyor belt, may also be used.

What is claimed is:

1. A method for reading a bar code symbol, said method comprising:

capturing and storing a two dimensional image in a memory, said stored two dimensional image containing an image of a bar code symbol anywhere within the field of view of said stored two dimensional image;

locating an area within the field of view of said stored two dimensional image, said located area being likely to contain a bar code image, said locating step including the step of comparing two substantially parallel scan line segments by comparing corresponding points of a function of the reflectance waveforms of said two substantially parallel scan line segments, said function having a plurality of output points for each of said scan line segments;

examining the image within said located area to determine the orientation of said bar code image within said located area of said stored two dimensional image;

filtering said bar code image along an axis substantially perpendicular to said detected orientation of said bar code image; and scanning said filtered bar code image to read out information contained in said bar code image.

2. A method for reading a bar code symbol, said method comprising:

capturing and storing a two dimensional image in a memory, said stored two dimensional image containing an image of a bar code symbol anywhere within the field of view of said stored two dimensional image;

locating an area within the field of view of said stored two dimensional image, said located area being likely to contain a bar code image, said locating step including the step of comparing two substantially parallel scan line segments by comparing corresponding points of a function of the reflectance waveforms of said two substantially parallel scan line segments, said function having a plurality of output points for each of said scan line segments;

examining the image within said located area to determine the orientation of said bar code image within said located area of said stored two dimensional image; and scanning said located area along an angle substantially equal to said determined orientation of bar code image to read out information contained in said bar code image.

3. A method for reading a bar code symbol, said method comprising:

capturing and storing a two dimensional image in a memory, said stored two dimensional image containing an image of a bar code symbol anywhere within the field of view of said stored two dimensional image;

a first image processing phase including locating an area within the field of view of said stored two dimensional image, said first processing phase including the step of comparing two substantially parallel scan line segments by comparing corresponding points of a function of the reflectance waveforms of said two substantially parallel scan line segments, said function having a plurality of output points for each of said scan line segments wherein said located area is more likely to contain a bar code image as compared to the other areas of said stored two dimensional image; and a second image processing phase including scanning said located area of said stored two dimensional image to read out information contained in said bar code image.

4. A method for reading a bar code symbol, said method comprising:

capturing and storing a two dimensional image in a memory, said stored two dimensional image containing an image of a bar code symbol anywhere within the field of view of said stored two dimensional image;

locating said bar code by comparing two substantially parallel scan line segments by comparing corresponding points of a function of the reflectance waveforms of said two substantially parallel scan line segments, said function having a plurality of output points for each of said scan line segments; and scanning said stored two dimensional image in an omnidirectional manner in order to read out information contained in said stored two dimensional image of said bar code symbol.

5. A method in accordance with claim 4, wherein said step of scanning said stored two dimensional image in an omnidirectional manner further includes:

examining the image within said located area to determine the orientation of said bar code image within said located area of said stored two dimensional image.

6. A method in accordance with claim 5, wherein said step of scanning said stored two dimensional image in an omnidirectional manner further includes:

filtering said bar code image along an axis substantially perpendicular to said detected orientation of said bar code image.

7. A method in accordance with claim 6, wherein said step of scanning said stored two dimensional image in an omnidirectional manner further includes:

extracting sequential values from said bar code image to read out information contained in said bar code image.

8. An apparatus for reading a bar code symbol, said apparatus comprising:

means for capturing and storing a two dimensional image in a memory, said stored two dimensional image containing an image of a bar code symbol anywhere within the field of view of said stored two dimensional image;

means for locating an area within the field of view of said stored two dimensional image, said located area being likely to contain a bar code image, said locating means including means for comparing two substantially parallel scan line segments by comparing corresponding points of a function of the reflectance waveforms of said two substantially parallel scan line segments, said function having a plurality of output points for each of said scan line segments;

means for examining the image within said located area to determine the orientation of said bar code image within said located area of said stored two dimensional image;

means for filtering said bar code image along an axis substantially perpendicular to said detected orientation of said bar code image; and means for scanning said filtered bar code image to read out information contained in said bar code image.

9. An apparatus for reading a bar code symbol, said apparatus comprising:

means for capturing and storing a two dimensional image in a memory, said stored two dimensional image containing an image of a bar code symbol anywhere within the field of view of said stored two dimensional image;

means for locating an area within the field of view of said stored two dimensional image, said located area being likely to contain a bar code image, said locating means including means for comparing tow substantially parallel scan line segments by comparing corresponding points of a function of a function of the reflectance waveforms of said two substantially parallel scan line segments, said function having a plurality of output points for each of said scan line segments;

means for examining the image within said located area to determine the orientation of said bar code image within said located area of said stored two dimensional image; and means for scanning said located area along an angle substantially equal to said determined orientation of said bar code image to read out information contained in said bar code image.

10. An apparatus for reading a bar code symbol, said apparatus comprising:

means for capturing and storing a two dimensional image in a memory, said stored two dimensional image containing an image of a bar code symbol anywhere within the field of view of said stored two dimensional image;

first phase image processing means including means for locating an area within the field of view of said stored two dimensional image, said first phase processing means including means for comparing two substantially parallel scan line segments by comparing corresponding points of a function of the reflectance waveforms of said two substantially parallel scan line segments, said function having a plurality of output points for each of said scan line segments, wherein said located area is more likely to contain a bar code image as compared to the other areas of said stored two dimensional image; and second phase image processing means including means for scanning said located area of said stored two dimensional image to read out information contained in said bar code image.

11. An apparatus for reading a bar code symbol, said apparatus comprising:

means for capturing and storing a two dimensional image in a memory, said stored two dimensional image containing an image of a bar code symbol anywhere within the field of view of said stored two dimensional image;

means for locating said bar code by comparing two substantially parallel scan line segments by comparing corresponding points of a function of the reflectance waveforms of said two substantially parallel scan line segments, said function having a plurality of output points for each of said scan line segments; and means for scanning said stored two dimensional image in an omnidirectional manner in order to read out information contained in said stored two dimensional image of said bar code symbol.

12. A method in accordance with claim 11, wherein said means for scanning said stored two dimensional image in an omnidirectional manner further includes:

means for examining the image within said located area to determine the orientation of said bar code image within said located area of said stored two dimensional image.

13. An apparatus in accordance with claim 12, wherein said means for scanning said stored two dimensional image in an omnidirectional manner further includes:

means for filtering said bar code image along an axis substantially perpendicular to said detected orientation of said bar code image.

14. An apparatus in accordance with claim 13, wherein said means for scanning said stored two dimensional image in an omnidirectional manner further includes:

means for extracting sequential values from said bar code image to read out information contained in said bar code image.

15. A method for reading a bar code symbol, said method comprising:

capturing and storing a two dimensional image in a memory, said stored two dimensional image containing an image of a bar code symbol anywhere within the field of view of said stored two dimensional image;

locating and coarsely orienting an area within the field of view of said stored two dimensional image, said located and coarsely oriented area being likely to contain a bar code image;

examining the image within said located and coarsely oriented area by comparing two substantially parallel scan line segments by comparing corresponding points of a function of the reflectance waveforms of substantially parallel scan line segments at a multiplicity of shifts of one of said scan line segments relative to said other of said scan line segments along the direction of said scan line segments to determine the fine orientation of said bar code image within said located and coarsely oriented area of said stored two dimensional image; and filtering said bar code image along an axis substantially perpendicular to said detected fine orientation of said bar code image by shifting at least two said substantially parallel scan line segments into substantial alignment, and combining corresponding data points of at least two said shifted substantially parallel scan line segments.

16. A method for reading a bar code symbol in accordance with claim 15, further comprising:

scanning said fine oriented and bar code image along an angle substantially equal to said determined fine orientation of bar code image to read out information contained in said bar code image.

17. A method for reading a bar code symbol, said method comprising:

capturing and storing a two dimensional image in a memory, said stored two dimensional image containing an image of a bar code symbol anywhere within the field of view of said stored two dimensional image;

locating and orienting an area by comparing two substantially parallel scan line segments by comparing corresponding points of a function of the reflectance waveforms of substantially parallel scan line segments at a multiplicity of shifts of one of said scan line segments relative to said other of said scan line segments along the direction of said scan line segments within the field of view of said stored two dimensional image, said located and oriented area being likely to contain a bar code image and;

filtering said ar code image along an axis substantially perpendicular to said detected orientation of said bar code image by shifting at least two said substantially parallel scan line segments into substantial alignment, and combining corresponding data points of at least two said shifted substantially parallels scan lines segments.

18. A method for reading a bar code symbol in accordance with claim 17, further comprising:

scanning said located and oriented area along an angle substantially equal to said determined orientation of bar code image to read out information contained in said bar code image.

19. An apparatus for reading a bar code symbol, said apparatus comprising:

means for capturing and storing a two dimensional image in a memory, said stored two dimensional image containing an image of a bar code symbol anywhere within the field of view of said stored two dimensional image;

means for locating and coarsely orienting an area within the field of view of said stored two dimensional image, said located and coarsely oriented area being likely to contain a bar code image;

means for examining the image within said located and coarsely oriented area to determine the fine orientation of said bar code image by comparing two substantially parallel scan line segments by comparing corresponding points of a function of the reflectance waveforms of substantially parallel scan line segments at a multiplicity of shifts of one of said scan line segments relative to said other of said scan line segments along the direction of said scan line segments within said located and coarsely oriented area of said stored two dimensional image; and means for filtering said bar code image along an axis substantially perpendicular to said detected fine orientation of said bar code image, said filtering means including means for shifting at least two said substantially parallel scan line segments into substantial alignment, and means for combining corresponding data points of at least two said shifted substantially parallel scan line segments.

20. An apparatus for reading a bar code symbol in accordance with claim 19, further comprising:

means for scanning said fine oriented and bar code image along an angle substantially equal to said determined fine orientation of bar code image to read out information contained in said bar code image.

21. An apparatus of reading a bar code symbol, said apparatus comprising:

means for capturing and storing a two dimensional image in a memory, said stored two dimensional image containing an image of a bar code symbol anywhere within the field of view of said stored two dimensional image; and means for locating and orienting an area by comparing two substantially parallel scan line segments by comparing corresponding points of a function of the reflectance waveforms of substantially parallel scan line segments at a multiplicity of shifts of one of said scan line segments relative to said other of said scan line segments along the direction of said scan line segments within the field of view of said stored two dimensional image, said located and oriented area being likely to contain a bar code image; and;

means for filtering said bar code image along an axis substantially perpendicular to said detected orientation of said bar code image, including means for shifting at least two said substantially parallel scan line segments into substantial alignment, and means for combining corresponding data points of at least two said shifted substantially parallel scan line segments.

22. An apparatus for reading a bar code symbol in accordance with claim 21, further comprising:

means for scanning said located and oriented area along an angle substantially equal to said determined orientation of said bar code image to read out information contained in said bar code image.

* * * * *